United States Patent
Brandt et al.

(10) Patent No.: US 9,964,761 B2
(45) Date of Patent: May 8, 2018

(54) HEAD-UP DISPLAY OF A MOTOR VEHICLE AND MOTOR VEHICLE

(71) Applicant: GM GLOBAL TECHNOLOGY OPERATIONS LLC, Detroit, MI (US)

(72) Inventors: Peter Brandt, Ruesselsheim (DE); Heiko Charle, Ruesselsheim (DE); Andreas Kreis, Ruesselsheim (DE); Horst Deichmann, Ruesselsheim (DE)

(73) Assignee: GM GLOBAL TECHNOLOGY LLC, Detroit, MI (US)

( * ) Notice: Subject to any disclaimer, the term of this patent is extended or adjusted under 35 U.S.C. 154(b) by 0 days. days.

(21) Appl. No.: 15/361,792

(22) Filed: Nov. 28, 2016

(65) Prior Publication Data

US 2017/0153451 A1 Jun. 1, 2017

(30) Foreign Application Priority Data

Nov. 26, 2015 (DE) .................... 20 2015 008 142 U

(51) Int. Cl.

| | |
|---|---|
| *G02B 27/01* | (2006.01) |
| *G06T 11/60* | (2006.01) |
| *G06T 7/00* | (2017.01) |
| *B60K 35/00* | (2006.01) |
| *G09G 5/377* | (2006.01) |

(52) U.S. Cl.
CPC .......... *G02B 27/0101* (2013.01); *B60K 35/00* (2013.01); *G02B 27/0149* (2013.01); *G06T 7/004* (2013.01); *G06T 11/60* (2013.01); *B60K 2350/2052* (2013.01); *G02B 2027/0141* (2013.01); *G02B 2027/0154* (2013.01); *G06T 2207/20212* (2013.01); *G06T 2207/20221* (2013.01); *G09G 5/377* (2013.01); *G09G 2340/12* (2013.01)

(58) Field of Classification Search
CPC . G06T 2207/20212; G06T 2207/20221; G06T 11/60; G06T 7/0004; G02B 27/01; G09G 5/377; G09G 2340/12; B60K 35/00; B60K 2350/2056
See application file for complete search history.

(56) References Cited

U.S. PATENT DOCUMENTS

| | | | |
|---|---|---|---|
| 5,667,701 A | 9/1997 | Sato et al. | |
| 5,905,477 A * | 5/1999 | Kuwayama ............ | B60K 35/00 345/7 |
| 6,100,943 A * | 8/2000 | Koide .................... | B60K 37/02 345/7 |

(Continued)

FOREIGN PATENT DOCUMENTS

WO 2008065812 A1 6/2008

*Primary Examiner* — Michelle L Sams
(74) *Attorney, Agent, or Firm* — Lorenz & Kopf LLP

(57) ABSTRACT

A head-up display for a motor vehicle includes a housing, which may be integrated into an instrument panel of the motor vehicle. A combiner is configured to combine an image of the head-up display and an environment in front of the motor vehicle observable through the combiner. The combiner is movable from a position of non-use into a position of use. An image generator is configured to generate the image. A cover may be brought into a closed position, which covers the housing when not in use. The cover has an opening to enable an emission of light of a light beam of the image generator with the cover closed.

12 Claims, 4 Drawing Sheets

(56) References Cited

U.S. PATENT DOCUMENTS

| | | | |
|---|---|---|---|
| 8,077,396 B2* | 12/2011 | Croy | B60K 35/00 |
| | | | 359/632 |
| 9,081,180 B2 | 7/2015 | Lee | |
| 2014/0002252 A1* | 1/2014 | Fong | B60Q 9/008 |
| | | | 340/435 |
| 2015/0146299 A1* | 5/2015 | Koseki | G02B 27/0101 |
| | | | 359/632 |
| 2015/0226964 A1 | 8/2015 | Sasaki et al. | |

* cited by examiner

HEAD-UP DISPLAY OF A MOTOR VEHICLE AND MOTOR VEHICLE

CROSS-REFERENCE TO RELATED APPLICATION

This application claims priority to German Patent Application No. 202015008142.8, filed Nov. 26, 2015, which is incorporated herein by reference in its entirety.

TECHNICAL FIELD

The present disclosure pertains to a head-up display of a motor vehicle and a corresponding motor vehicle are described below. The head-up display is provided to be integrated into a motor vehicle.

BACKGROUND

Head-up displays are display systems in which information is projected to a driver into his field of vision, which allows the driver to notice the information and, in so doing, to maintain his head posture. Head-up displays generally include an image-generating unit, an optics module and a projection surface. The image-generating unit generates the image which is to be projected and the optics module directs the image onto the projection surface. The projection surface is at least to a certain degree reflective and, at the same time, permeable to light. The image generated by the image-generating unit is superimposed, through the reflection on the projection surface, on the image of the environment lying therebehind. The user therefore sees the reflected image of the image-generating unit and, at the same time, the real world behind the reflection surface. The projection surface, which in technical terminology is designated as the combiner, may be on the windscreen or provided as a separate combiner. Separate combiners are generally retractable when not in use.

US 2014/0002252 discloses a motor vehicle display device with an obstacle detection device and a display unit on a surface of an instrument panel with first and second displays, which are configured to project a row of information dots onto the windscreen, such that these information dots superimpose with a real image.

Furthermore, collision warners are known, which are intended to warn a driver optically of an impending collision. Such optical warners are intended to gain the driver's attention in a very short space of time.

Motor vehicles offer a variety of facility variants able to be selected for the customer. For this reason, individual modules are developed for several functions, which are or are not installed in a motor vehicle according to the selected facility. The variety of necessary modules increases the logistical effort of the manufacturer and the costs rise when keeping replacement supplies in readiness. There is therefore an aim to reduce the complexity of motor vehicles and to achieve a greater integration of functions.

The problem is therefore raised to further develop a head-up display and a motor vehicle of the type mentioned in the introduction to the effect that no separate collision warning module is necessary.

SUMMARY

In accordance with the present disclosure, a head-up display for a motor vehicle includes a housing, which may be integrated into an instrument panel of the motor vehicle. The head-up display includes a combiner for combining an image of the head-up display and an environment in front of the motor vehicle, which is observable through the combiner, an image generator for generating the image and a cover, able to be brought into a closed position, which covers the housing when not in use. The combiner is movable from a position of non-use into a position of use. The cover has an opening configured to allow a light emission from at least of one beam of light of the image generator when the cover is closed.

The combiner includes a pane having an at least partially reflecting portion facing the driver and an at least partially transparent portion. The combiner may be configured as a semipermeable mirror. The combiner may also be configured as a glass or Plexiglas pane. On the air/pane interface, light is also reflected. The reflectance is great enough in order to be able to readily notice the image in the case of a sufficiently powerfully luminous image generator. The combiner is arranged in a position of use usually in the lower region of a field of vision of the driver. Through the combiner, the environment of the motor vehicle is able to be observed, so that the real environment image is combined with the image generated by the image generator.

The image generator may be an LCD display. The image generated by the image generator may present information relevant to driving, which is usually displayed in the instrument panel, e.g. current speed, permitted maximum speed, rotation speed, navigation instructions and suchlike.

By moving the combiner from a position of non-use into a position of use and vice versa, optical irritations at the edges of the combiner can be avoided when the head-up display is not in use. The head-up display can be covered by the cover when it is not activated, which on the one hand prevents reflections through the components of the head-up display on the windscreen and on the other hand reduces a contamination of the image-generating elements.

Through the fact that the cover has an opening, in order to enable a light emission for at least of one light beam of the image generator when the cover is closed, information can also be issued when the head-up display is closed. The at least one light beam can be reflected by the windscreen and therefore arrives into the field of vision of the driver. Therefore, a hazard warning, e.g. a collision warning, can be realized by a head-up display, because information is able to be issued both in the case of an activated and also in the case of a deactivated head-up display. A separate warning system with separate displays can be eliminated. This configuration increases the integration, which reduces the complexity of the different motor vehicle variants, the logistics, the necessary installation space and the costs.

In a first further development, the image generator has at least one LED for generating the light beam. LEDs can be provided additionally for other image-generators. LEDs have very short response times and are therefore well suited for generating a warning light. In addition, the activation is simple, so that also the expenditure of time for this is small. In addition, the LEDs can be positioned with respect to the cover, in some cases including the position of the deflection mirror, such that beams entering through the opening in the cover lie in the field of vision of the driver.

The image generator may have several components, which are distributed spatially in the head-up display. Within the scope of the two above-mentioned configurations, the regions or the LEDs which are provided for the emission of the light beam through the closed cover, can be arranged at a different position than the part of the image generator which is responsible for the generation of the image information which is to be projected onto the combiner. The practical configuration is dependent on the respective construction of the head-up display and can depend on several factors including the installation position of the head-up display relative to the windscreen and the inclination of the windscreen.

In a further developing configuration, a deflection mirror can be provided for deflecting the image onto the combiner. This configuration increases, on the one hand, the optical distance, which permits the reflection of the image to appear at a greater distance in front of the driver, and permits on the other hand an arrangement of the image generator in a region lying further to the front in the direction of travel, in which under some circumstances there is more space in the instrument panel.

In another further developing configuration, the deflection mirror can be adjustable, so that a light beam which is generated by the image generator when the combiner is in the position of non-use is directed to a windscreen of the motor vehicle such that the reflection of the light beam lies in a field of vision of a driver of the motor vehicle. In this way, the beam guidance can be configured such that the reflection of the light beam lies in the windscreen at a specified height, which otherwise would lie at a different height, for example in a region which is to be kept free. An adjustable deflection mirror can, moreover, permit an image generator with an image-generating region. The adjustment of the deflection mirror can take place with a separate actuator or on actuation of other components, in particular the cover. For this, according to a further developing configuration, the deflection mirror can be swivellable and/or movable. The moving of the deflection mirror can take place linearly or along a curved path.

According to a further developing configuration, the combiner can be adjustable, in order to adapt the display height of die information which is reflected. For this, the combiner can be vertically adjustable and/or swivellable.

In another further developing configuration, the opening can be provided with a light-permeable pane or film, which prevents a contamination of the interior of the head-up display. In another further developing configuration, the pane or film can be translucent, whereby the representation contrast is reduced. Hereby, a dazzling of the driver by contrasts which are too high can be prevented. Furthermore, according to another further developing configuration, the pane or film can be a color filter. The color filter can be, in particular, dark, so that a uniformly dark appearance of the instrument panel is produced, through which a dazzling of the driver by sudden jumps in brightness in the instrument panel, which become visible as a reflection, can be prevented. Such a color filter can be, for example, a red filter. Red filters can appear substantially black, but can be transparent or translucent for red light. The color emitted by the image generator is then adapted so that at least parts of the emitted light arrive through the filter and onto the windscreen, to warn the driver.

In another further developing configuration, provision can be made that the combiner is the cover. In this way, the number of necessary components can be reduced. In addition, the combiner can be brought into the position of non-use in a space-saving manner.

In another further developing configuration, provision can be made that the combiner has a color filter. The color filter can be arranged such that in operation of the head-up display it is arranged outside the region which is used.

Another further developing aspect provides a linear drive and/or a rotary drive are provided, to move the combiner between the position of non-use and the position of use. The linear drive can guide the combiner on a straight path or on a curved path. A rotary drive can have corresponding kinematics, to enable more complex trajectories, e.g. for adjusting the combiner for adapting the image position.

A first independent subject relates to a motor vehicle with a head-up display of the above-mentioned type. A corresponding motor vehicle permits the realization of a collision warning by means of a head-up display and therefore with less complexity than in the case of separate collision warners and head-up displays.

A further independent subject relates to a head-up display of a motor vehicle with a housing, which is integrated into an instrument panel of the motor vehicle, including a combiner for combining an image of the head-up display and an environment in front of the vehicle, able to be observed through the combiner, an image generator for generating the image and a deflection mirror for deflecting the image generated by the image generator onto the combiner. The deflection mirror is adjustable, to project at least one light beam, generated by the image generator, onto the windscreen when a combiner is in the position of non-use. The combiner is movable from a position of non-use into a position of use.

Through the adjustable deflection mirror, the position of the light beam projected onto the windscreen can be adjusted so that the reflection lies in the field of vision of the driver.

Otherwise, reference is made to the features of the configurations of the previously described head-up display, which can be provided in further developments of this subject.

A further independent subject relates to a method for operating a head-up display with a housing, which is provided to be integrated into an instrument panel of the motor vehicle, including a combiner for combining an image of the head-up display and of an environment in front of the vehicle which can be observed through the combiner and an image generator for generating the image, and a combiner situated in a position of non-use, in the case of an impending hazard at least one light beam is generated by the image generator and is projected onto the windscreen. The combiner is movable from a position of non-use into a position of use. In this way, with a non-active head-up display, a hazard warning e.g. a collision warning, can be emitted.

In a further developing configuration, a deflection mirror can be provided, which with a combiner situated in position of non-use or to be moved or moving into non-position, is adjusted into another position, so that the light beam to be projected onto the windscreen is adjustable in its position.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be hound by any theory presented in the preceding background of the invention or the following detailed description.

Figure 1A:
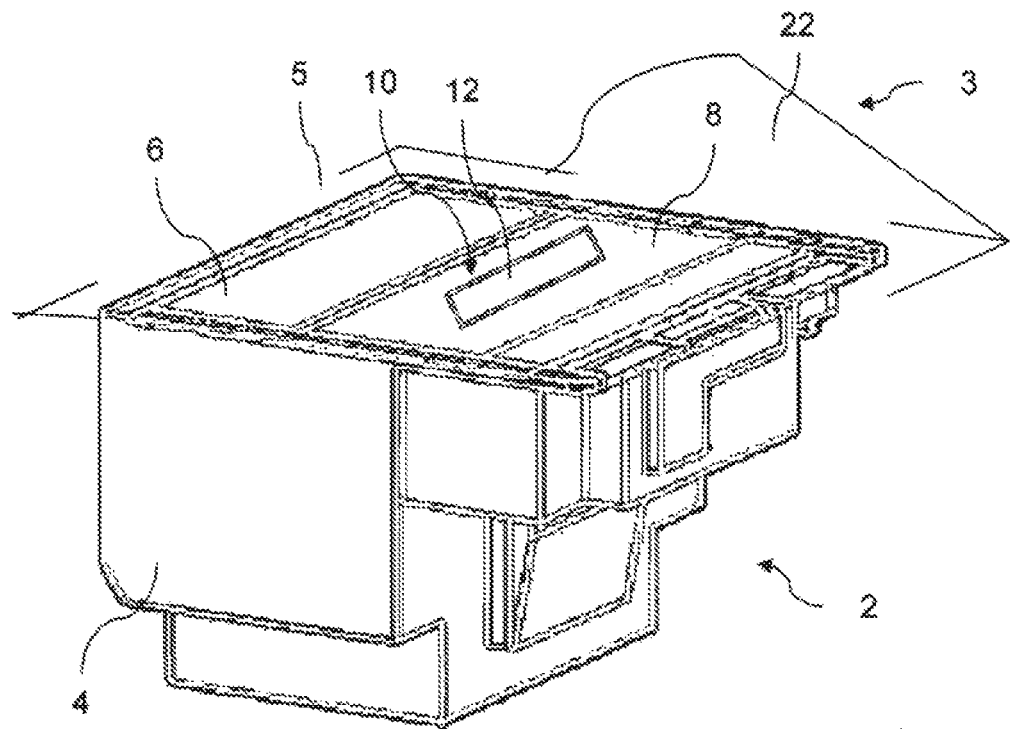
FIGS. 1a-1d illustrate different views of a head-up display according to a first embodiment.

FIG. 1a to 1d show different views of a head-up display 2 in a first embodiment for arrangement in a motor vehicle 3. FIG. 1a shows a diagrammatic perspective view of the head-up display 2 in position of non-use. The head-up display 2 has a housing 4 which is provided for installation into an instrument panel 5 of the motor vehicle 3. In the housing 4 the optical components of the head-up display 2 are arranged.

In the illustrated state of non-use, the optical components of the head-up display 2 are covered by a two-part covering, which has a first flap 6 and a second flap 8. The second flap 8 has an opening 10, which is provided with a color filter 12. Light, the wavelengths of which lie in the transmissive range of the color filter 12, can arrive through the opening 10 from the interior of the housing 4 of the head-up display 2 outwards.

In one configuration, the color filter 12 can be a red filter, which has a very dark impression and therefore scarcely stands out from the remaining materials of the instrument panel. It is thereby prevented that in the region of the opening 10 a possibly irritating high-contrast reflection can be cast onto a windscreen of the motor vehicle.

Figure 1B:
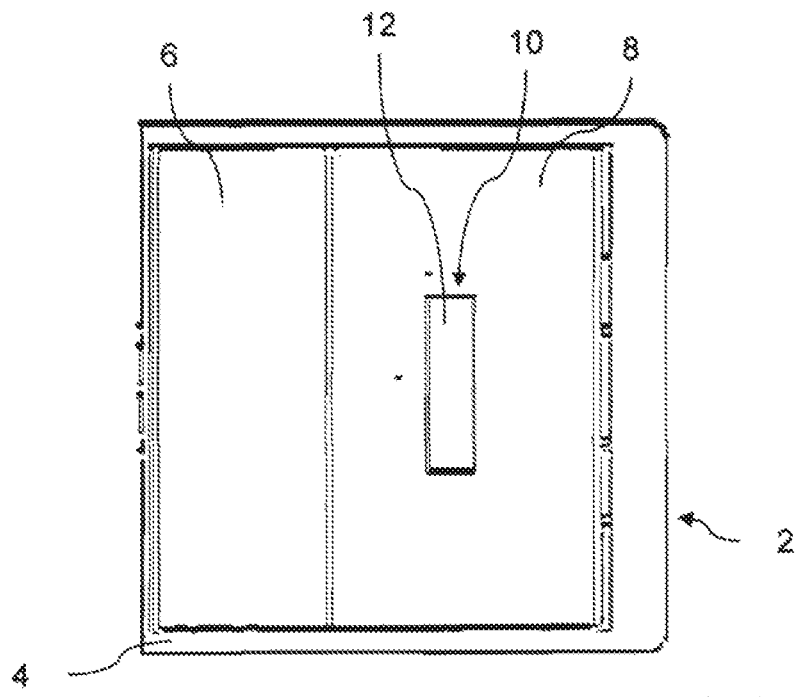

FIG. 1b shows a top view onto the head-up display 2. In the top view, the two-part flap 8, 10 together with the position of the opening 10 in the second flap 8 can be seen.

Figure 1C:
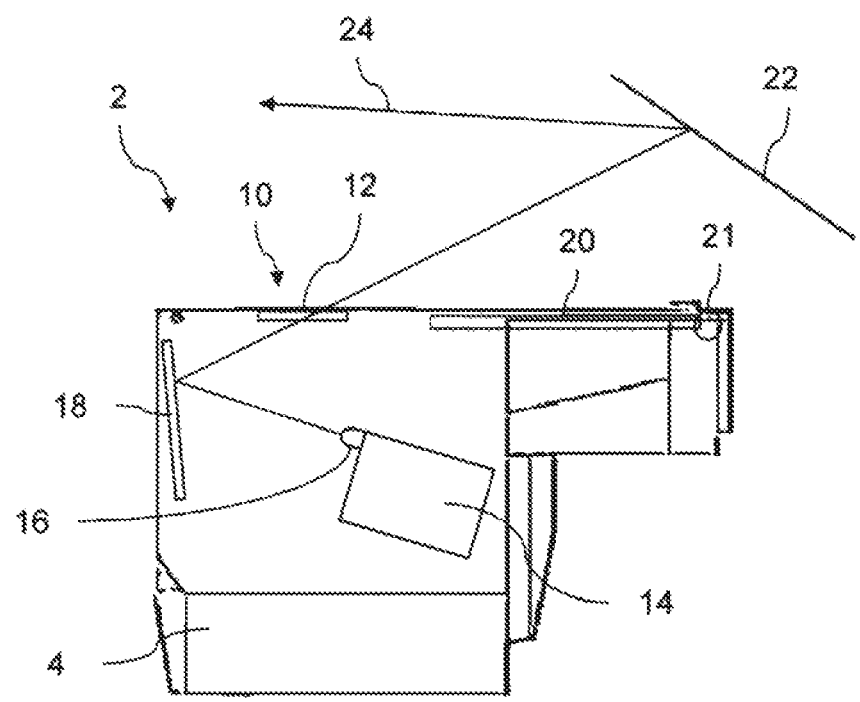

FIG. 1c shows a side view in section of the head-up display 2. In the interior of the housing an image generator 14 is arranged, which generates an image which is to be displayed. The image can contain information relevant to driving, such as e.g. speed, navigation instructions and suchlike. The image generator 14 can put different technologies into effect, for example can be constructed as an LCD screen.

The image generator 14 has, in addition, LEDs 16, which may generate a warning light in the case of, for example, an impending collision.

A deflection mirror 18 is arranged opposite the image generator 14. The deflection mirror 18 deflects an image generated by the image generator 14.

Beneath the second flap 8 a combiner 20 is arranged, which is mounted in the housing 4 to be pivotable in a motor-driven manner by means of a rotary drive 21. Light generated by the LEDs 16, which is deflected via the deflection mirror 18, can emerge from the housing 4 through the opening 10 with the color filter 12 and impinge onto a windscreen 22 of the motor vehicle, from where the light beam 24 can arrive into the field of vision of the driver. In this way, in the case of a deactivated head-up display 2, a warning light can be generated, which arrives into the field of vision of the driver.

Instead of providing separate LEDs, in an alternative variant a corresponding warning light can also be generated by the image generator itself, here therefore by the LCD. The use of LEDs enables a separate response thereof and an uncomplicated actuation, because the LEDs merely should be switched on and off. In addition, the reaction time is very small. Furthermore, the color spectrum of LEDs is precisely defined, so that the coordination between color filter 12 and LEDs 16 is simple.

Figure 1D:
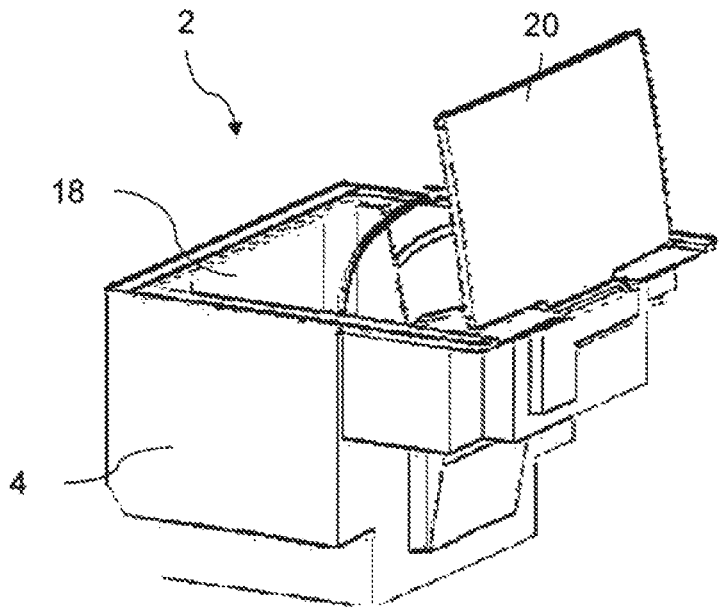

FIG. 1d shows a diagrammatic perspective illustration of the head-up display 2 in position of use. The cover 6, 8 is not illustrated here. The combiner 20 is swiveled out into a position of use. In this position, the environment can be observed through the combiner 20 and, at the same time, an image generated by the image generator 14 can be presented in a superimposed manner in reflection.

FIG. 2a-d show a second embodiment of a head-up display 2'. In the illustrated embodiment, in contrast to the previous embodiment, a deflection mirror is dispensed with, a projection of the image of the image generator 14 can take place directly onto the combiner 20.

In a further difference to the embodiment according to FIG. 1a-d, the combiner 20 is guided here on lever kinematics 26 actuated by a rotary drive 21, which permits a vertical adjustment of the combiner 20 and therefore an adapting of the image reproduction.

The housing 4 of the head-up display 2' also has a cover 28, which has an opening 30, through which a light beam can arrive from LEDs 16 onto the windscreen 22.

Figure 2A:
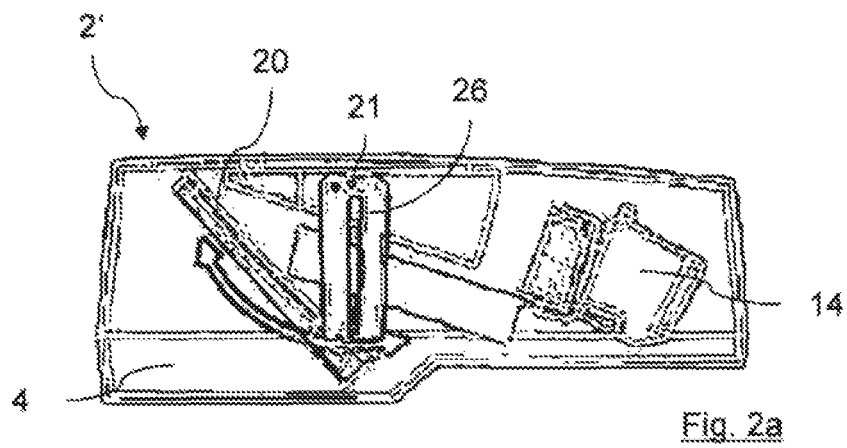
FIGS. 2a-d illustrate side views in section of a head-up display according to a second embodiment.
Figure 2B:
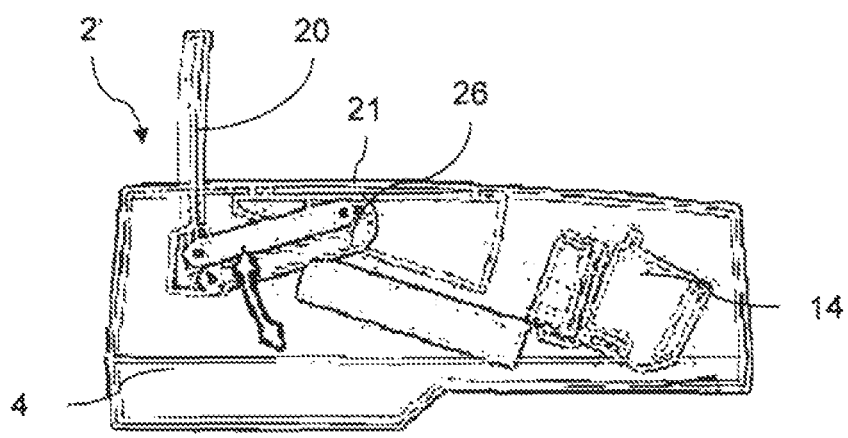
Figure 2C:
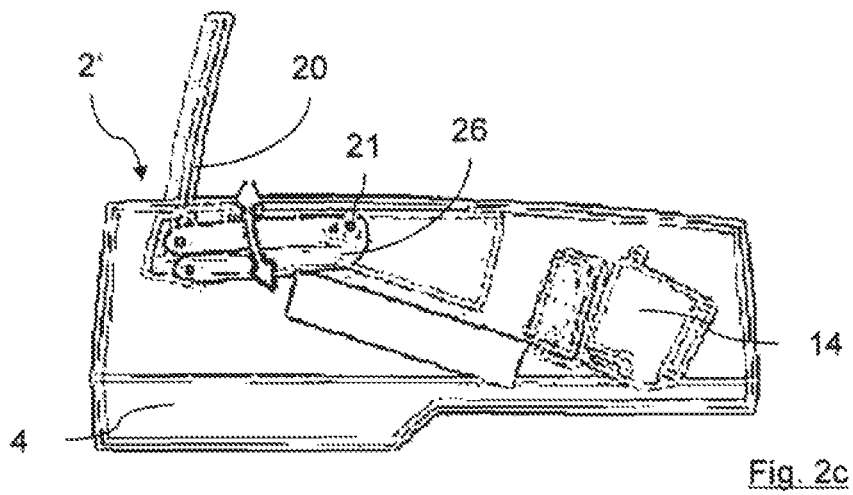
Figure 2D:
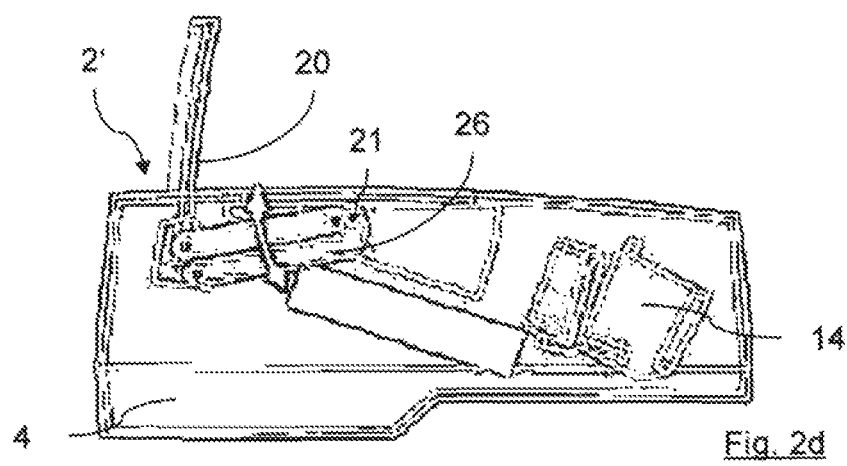

The different positions of the combiner 20 are illustrated in FIGS. 2b to 2d, in which the combiner 20 is extended, wherein FIG. 2b shows a position in which the reflected image appears higher, FIG. 2b a position in which the reflected image lies lower and FIG. 2c a neutral position lying therebetween.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A head-up display of a motor vehicle comprising:
    a housing configured to be integrated into an instrument panel of the motor vehicle;
    an image generator configured to generate an image;
    a combiner configured to combine the image and an environment in front of the motor vehicle and observable through the combiner, wherein the combiner is movable from a position of non-use into a position of use; and
    a cover positionable into a closed position, which covers the housing when not in use, wherein the cover has an opening configured to emit light of a light beam of the image generator with the cover in the closed.

2. The head-up display according to claim 1, wherein the image generator comprises at least one LED for generating the light beam.

3. The head-up display according to claim 1, further comprising a deflection mirror configured to deflect the image onto the combiner.

4. The head-up display according to claim 3, wherein the deflection mirror is adjustable, wherein at least one light beam, which is generated by the image generator, with the combiner situated in the position of non-use, is directed to a windscreen of the motor vehicle such that the reflection of the light beam lies in a field of vision of a driver of the motor vehicle.

5. The head-up display according to claim 1, further comprising a light-permeable element provided in the opening.

6. The head-up display according to claim 5, wherein the light-permeable element comprises at least one of a pane or a filter.

7. The head-up display according to claim 5, wherein the light-permeable comprises a color filter.

8. The head-up display according to claim 1, wherein the combiner includes the cover.

9. The head-up display according to claim 8, wherein the combiner comprises a color filter.

10. The head-up display according to claim 1, further comprising a drive mechanism configured to move the combiner between the position of non-use and the position of use.

11. The head-up display according to claim 10, wherein the drive mechanism comprises at least one of a linear drive or a rotary drive.

12. A motor vehicle comprising:
an instrument panel;
a housing integrated into the instrument panel;
an image generator configured to generate an image;
a combiner configured to combine the image and an environment in front of the motor vehicle and observable through the combiner, wherein the combiner is movable from a position of non-use into a position of use; and
a cover positionable into a closed position, which covers the housing when not in use, wherein the cover has an opening configured to emit light of a light beam of the image generator with the cover in the closed.

* * * * *